(12) United States Patent
Olsen

(10) Patent No.: US 8,346,837 B2
(45) Date of Patent: Jan. 1, 2013

(54) COORDINATE TRANSFORMATION FOR PRESENTATION IN DISPLAY SYSTEMS

(75) Inventor: Terje Sparre Olsen, Halden (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1088 days.

(21) Appl. No.: 12/063,890

(22) PCT Filed: Aug. 17, 2005

(86) PCT No.: PCT/NO2005/000292
§ 371 (c)(1),
(2), (4) Date: Feb. 15, 2008

(87) PCT Pub. No.: WO2007/024135
PCT Pub. Date: Mar. 1, 2007

(65) Prior Publication Data
US 2008/0243984 A1    Oct. 2, 2008

(51) Int. Cl.
*G06F 7/38* (2006.01)
(52) U.S. Cl. .................... 708/442; 708/443; 708/444
(58) Field of Classification Search .................... None
See application file for complete search history.

(56) References Cited

U.S. PATENT DOCUMENTS

| | | | | |
|---|---|---|---|---|
| 4,241,412 A * | 12/1980 | Swain | | 708/442 |
| 4,434,437 A | 2/1984 | Strolle | | |
| 4,547,803 A * | 10/1985 | Richards | | 348/442 |
| 4,583,191 A * | 4/1986 | Piesinger | | 708/442 |
| 4,987,412 A * | 1/1991 | Vaitekunas et al. | | 345/635 |
| 5,455,591 A | 10/1995 | Hui | | |
| 6,772,181 B1 * | 8/2004 | Fu et al. | | 708/313 |
| 6,874,006 B1 * | 3/2005 | Fu et al. | | 708/442 |

\* cited by examiner

Primary Examiner — Michael D Yaary
(74) Attorney, Agent, or Firm — Roger S. Burleigh

(57) ABSTRACT

A system and method for displaying data provided by a sensor in Polar coordinates on a raster scan device operating in Cartesian coordinates. Cartesian coordinates for display points on said raster scan device are converted to corresponding Polar coordinates, and sensor data values for said Polar coordinates are fetched for display on said raster scan device. The coordinates are converted by differentiating the equations mapping Polar coordinates to Cartesian coordinates, and solving the differential relationships using a suitable integration method. Preferable the integration method is a Midpoint method. In order to avoid divisions and speed up the conversion process, synthetic division in Newton-Ralphson iteration is used instead.

10 Claims, 5 Drawing Sheets

COORDINATE TRANSFORMATION FOR PRESENTATION IN DISPLAY SYSTEMS

FIELD OF THE INVENTION

The present invention relates to instruments for surveying the environment with scanning sensors in general, such as radars, sonars and medical ultrasound imaging equipment, and in particular to the display of received data in such instruments. Even though the invention will be described in relation to radars, the principle is basically applicable in any system based on acoustical or electromagnetic waves, the last including visible light, infrared radiation or x-ray radiation.

BACKGROUND OF THE INVENTION

Data from sensors such as radars and sonars are sampled in polar or spherical coordinate systems, i.e. the sensors are scanning the surroundings with an angularly displaced beam. In the past, the received data were also displayed in polar coordinates on Plan Position Indicators using a rotating beam on a cathode ray tube. However, most modern display systems are raster scan devices, which operate in Cartesian coordinate system. The sensor data must therefore be converted into Cartesian coordinates. The conversion is a very processing intensive process, and this is in particular true for sensor systems on a moving mobile platform.

Prior art systems for coordinate transformation are based on one of the following techniques:
  Direct mapping of (r,phi) to (x,y) coordinates by using "on the fly" calculations or by use of tables.
  Use of inverse mapping of (x,y) to (r,phi) coordinates by using on the fly calculations or by use of tables.
  Use of inverse mapping of (x,y) to (r,phi) coordinates by use of special circuits such as Pythagoras processors (ex. Plessey Semiconductor PDSP16330).

The direct mapping approach will miss many pixels in the display system because the mapping is neither a one-to-one nor an onto-mapping. Some interpolation or "spoke filling" is therefore necessary.

The inverse mapping approach will avoid the interpolation problem, but would also be more computer-intensive in the mapping calculations. Using tables will require recalculation of a new mapping table every time the area of display is moved or scaled. In mobile sensor scenarios where the display area is geographically fixed this can require time consuming recalculations of the tables. Hence, this is not an optimal solution for a system needing real-time performance.

BRIEF SUMMARY OF THE INVENTION

It is an object of the present invention to provide a system and method for fast and efficient transformation of data from Cartesian to Polar coordinates, i.e. based on an inverse mapping method. The system and method is in particular applicable in sensor systems located on a fast moving mobile platform.

The inventive method employs an algorithm in which transformation equations are expressed in differential form involving only arithmetic operations. According to a second aspect of the invention, the equations may be further reduced to only multiplications, additions and subtractions by using a simple differential solver method combined with a synthetic division method.

The scope of the inventive system and method appears from the appended claims.

BRIEF DESCRIPTION OF THE DRAWINGS

The advantages of the invention will become clear when reading the following description, in which the invention is described in detail in reference to the appended drawings, in which.

DETAILED DESCRIPTION OF THE INVENTION

Figure 1:
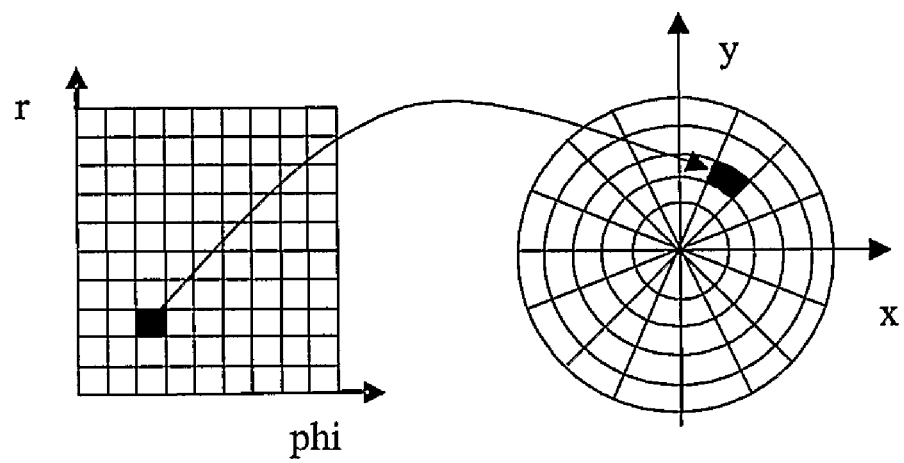
FIG. 1 is a diagram illustrating the mapping of Polar data to Cartesian grid.

FIG. 1 illustrates the problem of which the present invention provides a possible solution. A sensor, which may be a radar antenna that is continuously scanning the horizon, will provide data in Polar coordinates as amplitudes versus angles, as illustrated in the right hand part of the figure. The display system displays the data in a Cartesian coordinate system as pixels organized in rows on a screen, as shown on the left. As explained above, the system may include a processor that transforms the Polar data into the Cartesian grid needed by the display system. However, the positions calculated from the Polar data will not fit precisely into the Cartesian grid, leaving vacant positions etc.

In the inverse mapping approach, the system will compute the Polar coordinates that correspond to each position in the Cartesian grid, and retrieve data (e.g. from a memory storing received data values) that appear in said Polar coordinate positions. The Polar coordinates are rounded to the nearest integer and used as addresses for retrieving data from memory.

Figure 2:
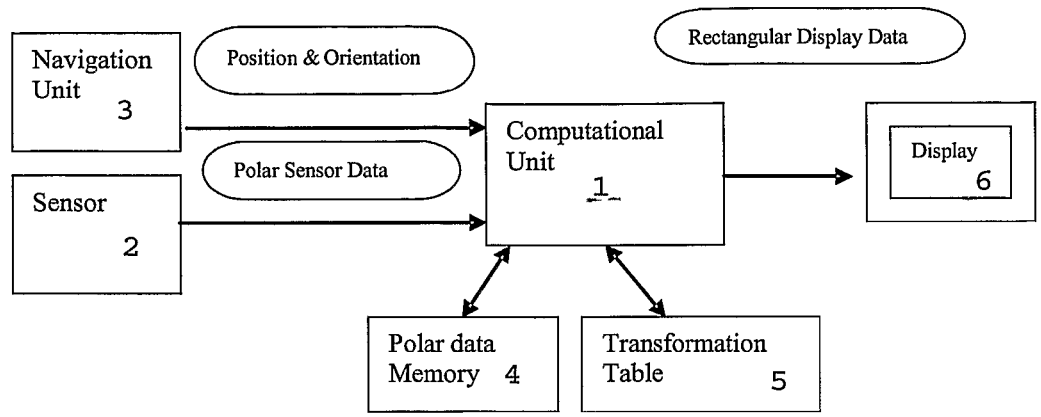
FIG. 2 shows a typical system implementation.

FIG. 2 illustrates the building block of a system adapted to perform the inventive method. The inventive system includes a computer, signal processor, ASIC, FPGA or other computational unit 1.

The computational unit 1 receives polar data from a source 2 (such as a radar sensor) to be converted to Cartesian coordinates. The computational unit 1 calculates the polar coordinates of each point of interest on a grid in the Cartesian system.

The system will perform the following tasks:
  The Navigation Unit 3 will check the position and if any changes have occurred it will update the transformation table 5.
  The Computational Unit 1 will receive Polar data from the Sensor 2 and buffer it in the Polar data memory 4.
  The Computational Unit 1 will transform data, collected from the Polar data memory 4, into Cartesian coordinates by using the algorithm described below. It will use the Transformation Table 5 as lookup for coordinate transformation when the position has not shifted.
  The data will be presented on a Display screen 6.

The method is based on describing the coordinate transformation of adjacent points as differential equations. A suitable integration method will then efficiently produce the coordinate transformations. Further division can be avoided by using synthetic division.

The algorithm used will only require six multiplications, two additions and two subtractions per coordinate.

Description of the Algorithm for Fast Coordinate Transformation

1. The Coordinate Transformations

The coordinate transformations needed to map the display coordinate(x,y) to the sensor coordinates (r,phi) are:

$$\varphi = a\tan\left(\frac{y}{x}\right)$$

$$r = \sqrt{x^2 + y^2}$$

2. Differential Equation Form.

Differentiate the coordinates with respect to the x direction gives:

$$\frac{d\varphi}{dx} = \frac{d\,a\tan(y/x)}{dx} = -\frac{y}{x^2} \cdot \frac{1}{1+\left(\frac{y}{x}\right)^2} = \frac{-y}{(x^2+y^2)} = \frac{-y}{r^2}$$

$$\frac{dr}{dx} = \frac{d\sqrt{(x^2+y^2)}}{dx} = \frac{x}{\sqrt{(x^2+y^2)}} = \frac{x}{r}$$

Using a differential method solver to calculate the functions along the x-axis will result in simple calculations without time consuming square root and inverse trigonometric function evaluations.

3. Solving Differential Equation Using Midpoint Method

A simple midpoint method shown below is a suited method because it requires a minimum of calculations.

$$f(x+2h) = f(x) + 2hf'(x+h)$$

This will require the following calculations:

$$\varphi(x+2h) = \varphi(x) - \frac{2*h*y}{r(x+h)^2}$$

$$r(x+2h) = r(x) + \frac{2*h*(x+h)}{r(x+h)}$$

h is normally chosen to be the same as the pixel resolution of the display system.

4. Synthetic Division

In order to further speed up the calculations division can be avoided by using synthetic division in a Newton-Ralphson iteration. As an initial value for the inverse the preceding inverse can be used:

$$rinv(x+h) = rinv(x)*(2-rinv(x)*r(x+h))$$

where rinv means 1/r.

If further accuracy is required, one more iteration can be performed.

$$rinv(x+h) = rinv(x+h)*(2-rinv(x+h)*r(x+h))$$

In practical use with normal accuracy requirements this is not needed.

Figure 3:
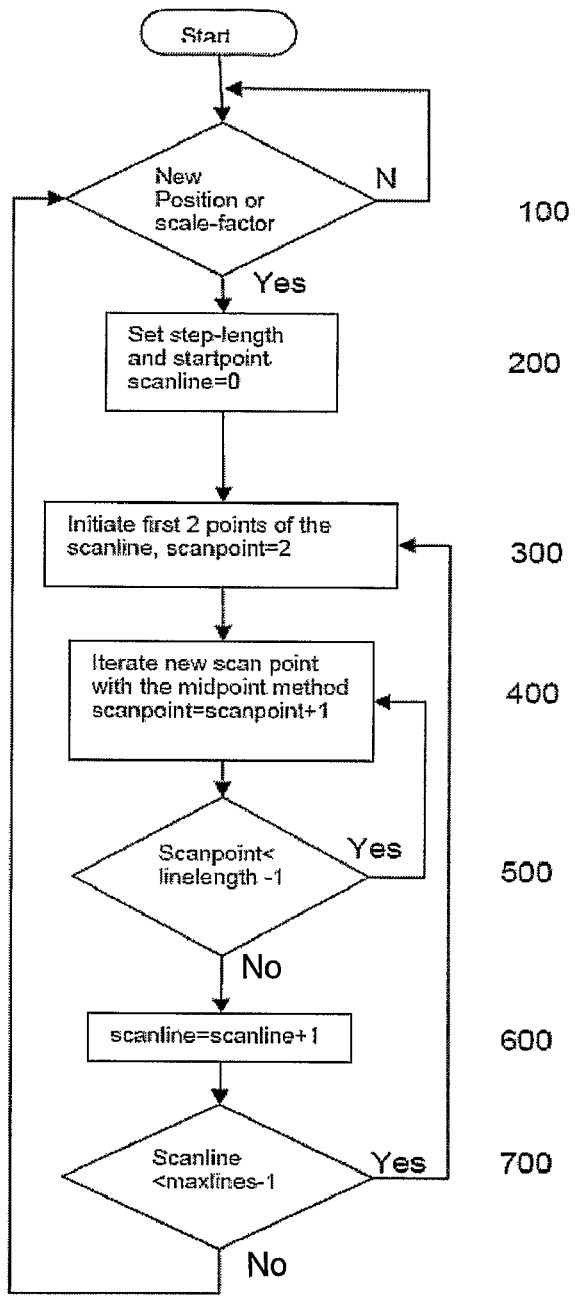
FIG. 3 is a flow diagram of the inventive coordinate transformation method.

FIG. 3 is a flow diagram illustrating the steps performed for coordinate transformation. The inventive method is based on finding the absolute position of the picture elements in the received data by merging with position data from the observation platform received from the navigation system. The computed (polar) position data is stored in a lookup table, from which position data is retrieved when displaying subsequent scans. Only when a displacement of the observation platform is detected, or the operator wants to change the picture scale factor, e.g. to highlight a particular area, a new calculation of polar coordinates is performed.

Figure 4:
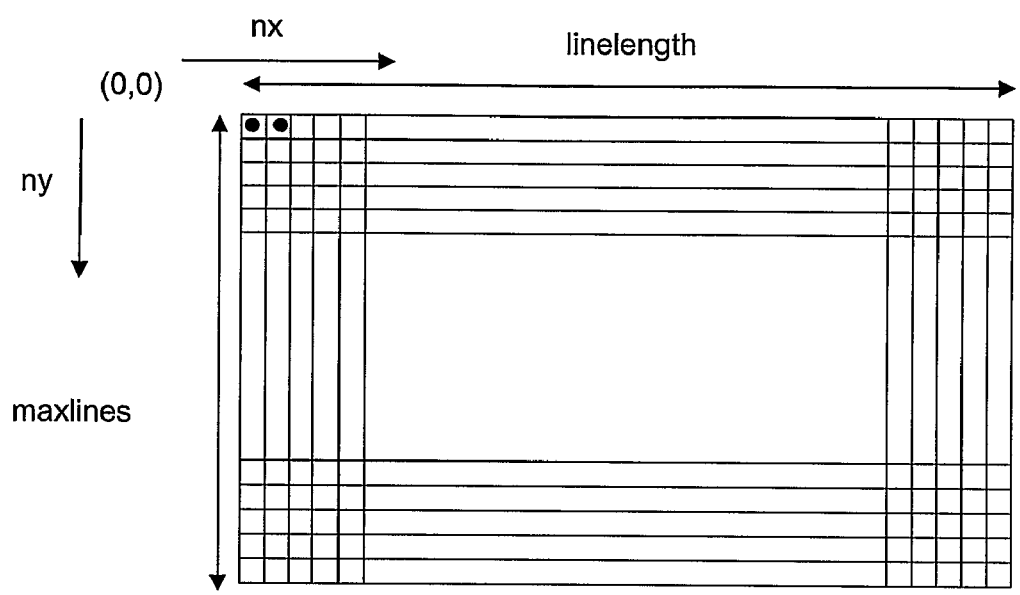
FIG. 4 shows a screen layout, i.e. how the pixels are presented in a grid system.

In FIG. 3 this is shown as loop 100 which is entered immediately after start. In step 200, step-lengths and start-points are decided upon. Then, the polar coordinate values corresponding to the first two points of the first scanline is found, step 300. FIG. 4 shows the layout of scanpoints and lines on the screen. Each pixel is given a position (nx, ny).

If we return to FIG. 3, step 300, for each scanline the two first coordinates can be calculated by using atan2 and square root calculations. The time needed for this is insignificant and can be avoided by calculating and storing the two initial points for each scanline by using the same differential method rotated 90 degrees.

In step 400, the position corresponding to the next scanpoint is calculated using the midpoint method as explained above. This is repeated until all scanpoints in a line has been found, step 500.

In steps 600 and 700, a test is made in order to decide if all scanlines have been completed. The outcome of the test decides if the process is to loop back to step 300 or, if all points has been found, to return to loop 100 and await a change in position or scale factor.

The method may also be described in the following pseudo code:

```
y=y0;
h2=2*h;   /*(h is horizontal pixel size)*/
for ny=0,maxlines-1
    y=y+ystep; /*vertical pixel size*/
    /* Initiate the two first (r,phi) calculations*/
    phi(0,ny)=atan2(y,x(0));
    phi(1,ny)=atan2(y,x(1));
    r(0,ny)=sqrt(x(0)*x(0)+y*y);
    r(1,ny)=sqrt(x(1)*x(1)+y*y);
    rinv(1)=1/r(1);
    h2y=h2*y;
    for nx=2,linelength-1
        rinv(nx)=rinv(nx-1)*(2-rinv(nx-1)*r(nx));
        r2inv(nx)=rinv(n)*rinv(n);
        phi(nx+1,ny)=phi(nx-1,ny)-h2y*r2inv(nx);
        r(nx+1,ny)=r(nx-1,ny)+h2*x(n)*rinv(nx);
        x(nx+1)=x(nx)+h;
    end
end
```

Figure 5:
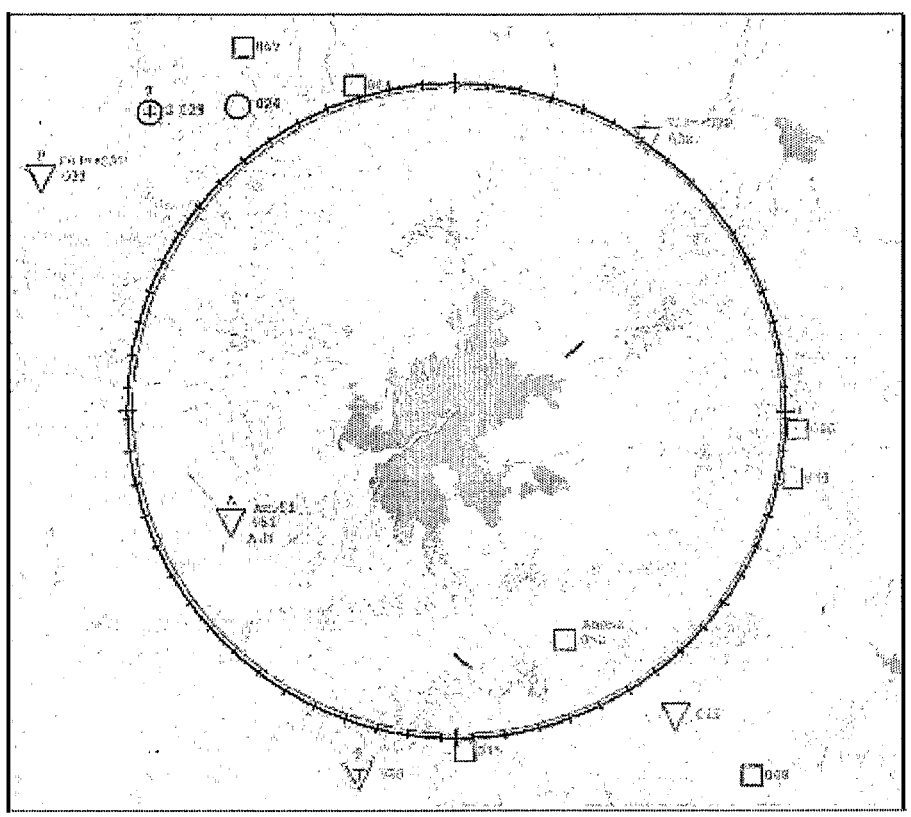
FIG. 5 shows an example on a screen layout, presenting objects in Cartesian coordinates.

An example of a resultant screen picture is shown in FIG. 5.

The invention claimed is:

1. A method for displaying Polar sensor data on a raster scan display device operating in a Cartesian coordinate system, said method comprising the steps of:
    converting Cartesian coordinates of display points into Polar coordinates by:
    mapping the Cartesian coordinates to Polar coordinates conversion as differential equations in respect of the x-direction;
    solving said differential equations using a midpoint method in respect of the x-direction in order to produce said Polar coordinates;
    fetching sensor data values for said Polar coordinates; and,
    displaying said sensor data values in said Cartesian coordinate display points.

2. The method recited in claim 1, wherein said differential equations are:

$$\frac{d\varphi}{dx} = \frac{-y}{r^2}$$

$$\frac{dr}{dx} = \frac{x}{r}$$

with respect to the x direction, where (r,φ) are Polar coordinates and (x,y) are Cartesian coordinates.

3. The method recited in claim 2, wherein said differential equations are integrated using the following relationships:

$$\varphi(x+2h) = \varphi(x) - \frac{2*h*y}{r(x+h)^2}$$

$$r(x+2h) = r(x) + \frac{2*h*(x+h)}{r(x+h)}$$

h being the pixel resolution of said display unit.

4. The method recited in claim 3, wherein synthetic division is used in a Newton-Ralphson iteration in order to avoid direct divisions.

5. The method recited in claim 4, wherein a division is regarded as a multiplication with an inverse, and using as an initial value for the inverse the preceding inverse:

$$rinv(x+h)=rinv(x)*(2-rinv(x)*r(x+h))$$

where rinv means 1/r.

6. The method recited in claim 5, further comprising the step of performing an additional iteration:

$$rinv(x+h)=rinv(x+h)*(2-rinv(x+h)*r(x+h)).$$

7. The method recited in claim 1, wherein polar position data is stored in a lockup table from which position data is retrieved when displaying subsequent scans.

8. The method recited in claim 1, further comprising an initial step in which polar coordinate values corresponding to the first two points of each scanline are determined.

9. The method recited in claim 8, wherein the polar coordinate values of said first two points are determined using trigonometric calculations.

10. The method recited in claim 8, wherein the polar coordinate values of said first two points are determined by using differentiations and integrations in respect of the y-direction.

* * * * *